(12) United States Patent
Smith et al.

(10) Patent No.: US 8,061,003 B2
(45) Date of Patent: Nov. 22, 2011

(54) METHOD FOR REPAIR OF A LOCOMOTIVE DIESEL MOTOR WATER MANIFOLD

(75) Inventors: Alistair Smith, Simpsonville, SC (US);
Wayne Ray Grady, Hamilton, OH (US);
Jesus Palomino, San Luis Potosi (MX);
Ron Souther, Campobello, SC (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 12/182,250

(22) Filed: Jul. 30, 2008

(65) Prior Publication Data
US 2010/0024187 A1     Feb. 4, 2010

(51) Int. Cl.
*B23P 6/00*     (2006.01)
(52) U.S. Cl. ............. 29/402.18; 29/402.01; 29/402.16; 138/97

(58) Field of Classification Search ............... 29/402.01, 29/402.02, 402.09, 402.16, 402.18, 458, 29/525.14, 527.2; 138/97–99
See application file for complete search history.

(56) References Cited

U.S. PATENT DOCUMENTS

| 2006/0248719 A1* | 11/2006 | Szela et al. | 29/889.7 |
| 2009/0094828 A1* | 4/2009 | Velez | 29/888.021 |
| 2010/0257733 A1* | 10/2010 | Guo et al. | 29/889.1 |

* cited by examiner

*Primary Examiner* — David Bryant
*Assistant Examiner* — Moshe Wilensky
(74) *Attorney, Agent, or Firm* — Global Patent Operation; John A. Kramer

(57) ABSTRACT

Methods for repairing and restoring water manifold pipes, particularly locomotive diesel motor water manifolds exhibiting excessive corrosion around at least one water port. Exemplary methods include inserting a pipe segment into a selected water port and using the inserted pipe segment as a build-up or brazing form. Braze material is applied in one layers around and against the inserted pipe segment. Excess braze material and the pipe segment are thereafter removed in order to restore the manifold pipe to an original dimension.

20 Claims, 8 Drawing Sheets

US 8,061,003 B2

METHOD FOR REPAIR OF A LOCOMOTIVE DIESEL MOTOR WATER MANIFOLD

BACKGROUND OF THE INVENTION

This invention relates generally to the repair of a liquid-carrying article, and more specifically to methods for repair or restoration of a diesel motor water manifold exhibiting corrosion adjacent a water port.

Heavy-duty engines in locomotives may be diesel engines that are used to generate electricity to power the electric motors to provide electromotive force to the wheels. Such diesel engines are water cooled where a metal pipe to each "power pack" of the diesel engine supplies water from a cooling manifold.

No matter how well a locomotive engine is constructed, over time and use, parts will require replacing, re-manufacturing, or repair. One such part is the inlet water manifold for the power assembly cylinder liners. Excessive corrosion around the water ports causes water leaks where the jumper lines connect the manifold to the power assembly cylinder liner. Currently, no methods exist for refurbishing a locomotive diesel inlet water manifold that has been rated as non-serviceable if the water manifold water ports and attachment flanges exhibit excessive corrosion.

Accordingly, it would be desirable to have methods and systems for repairing a diesel motor water manifold exhibiting excessive corrosion.

BRIEF DESCRIPTION OF THE INVENTION

The above-mentioned need or needs may be met by exemplary embodiments which provide methods for repairing and restoring a fluid carrying member, such as a water manifold pipe. An exemplary method comprises: a) providing a member capable of carrying fluid, wherein the member includes at least one orifice therein and at least one region of deficient dimension at an outer surface adjacent the orifice; b) providing a build-up form extending into the orifice; c) providing additive material to the at least one region around and against the build-up form to restore the at least one region to a sufficient dimension; and d) subsequent to (c), removing substantially all of the build-up form.

Another exemplary method comprises: a) providing a water manifold pipe for a diesel locomotive, wherein the water manifold pipe includes at least one orifice therein and at least one region of deficient dimension at an outer surface adjacent the orifice; b) inserting a pipe segment into the orifice, wherein when inserted, the pipe segment provides a build-up form adjacent the at least one region of deficient dimension; c) applying additive material to the water manifold pipe around and against the build-up form to restore the at least one region to a sufficient dimension; and d) subsequent to (c), removing substantially all of the pipe segment.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
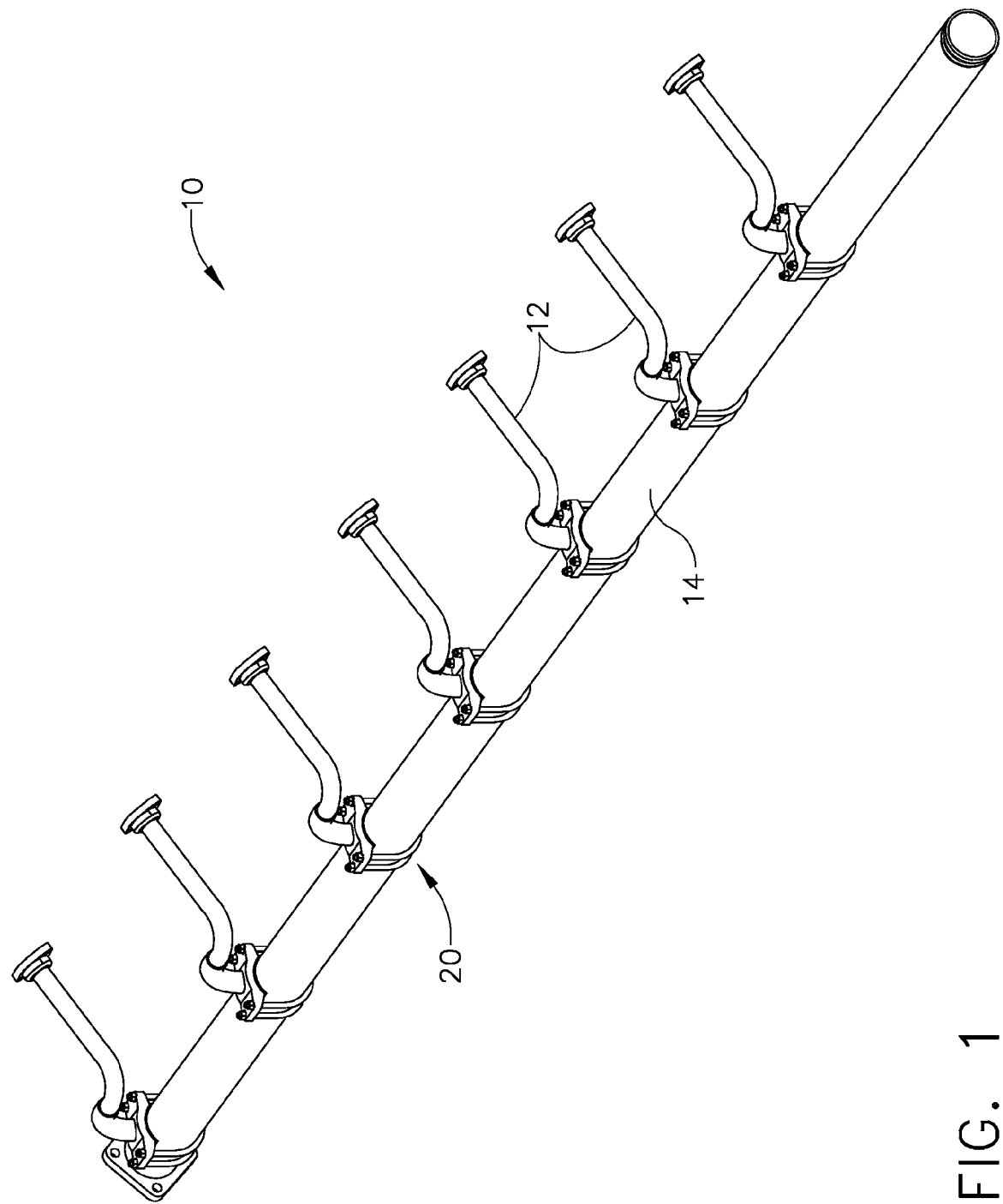
FIG. 1 is an isometric view of a water manifold and parallel feed pipe assembly.
Figure 2:
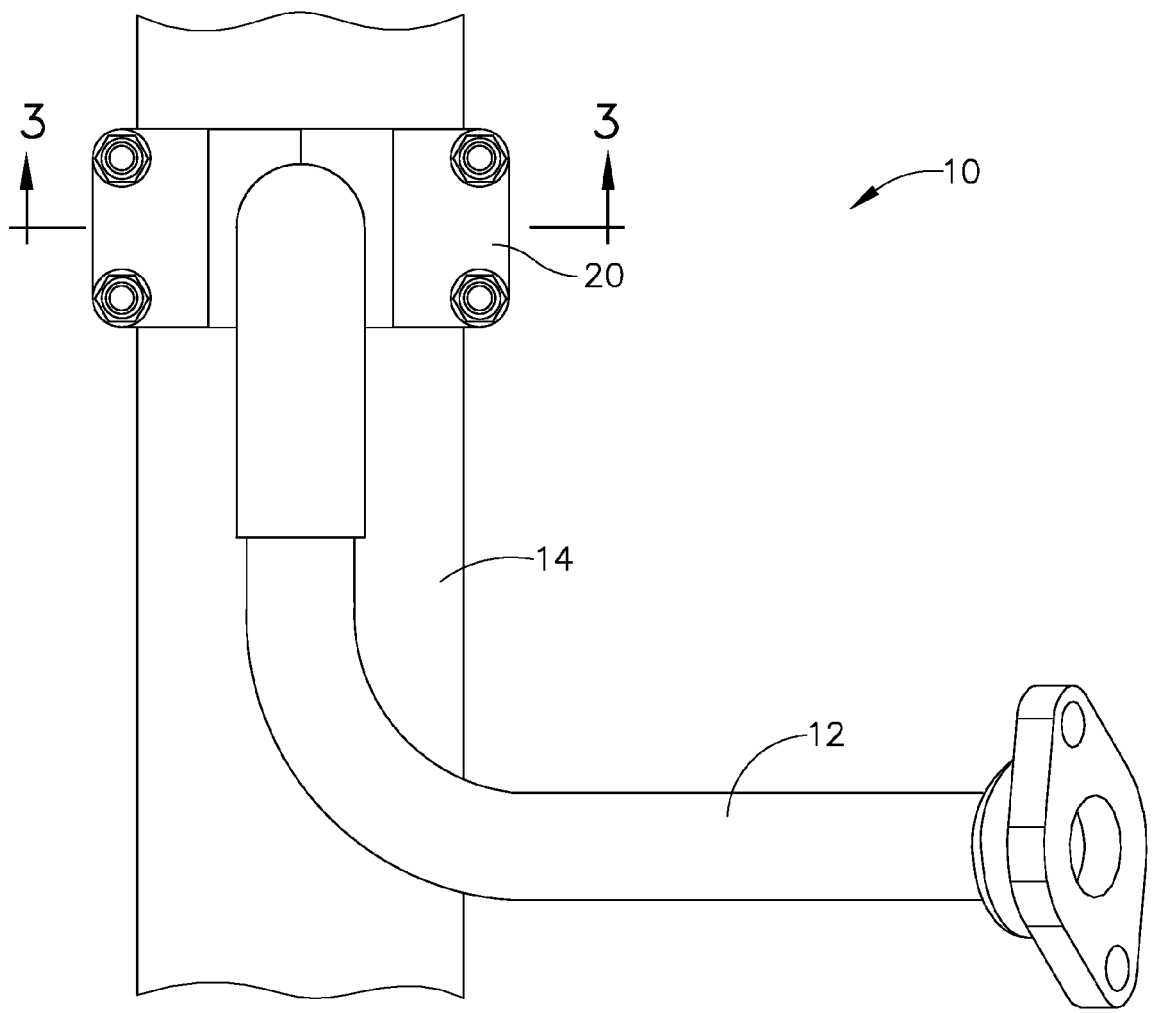
FIG. 2 is a plan view of a portion of the manifold pipe of FIG. 1 and one parallel feed pipe.
Figure 3:
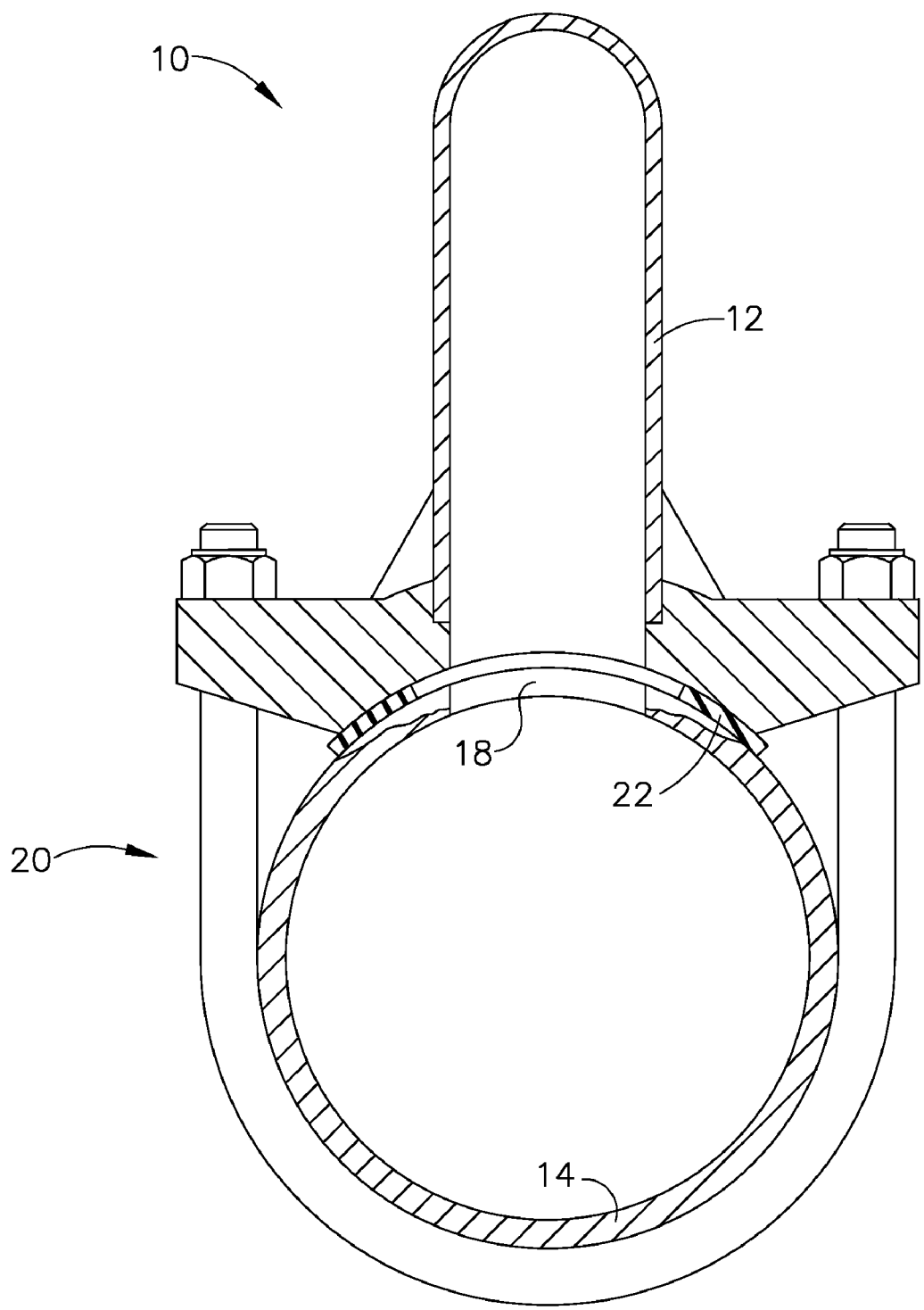
FIG. 3 is a sectional view taken along 3-3 of FIG. 2.

Referring to the drawings wherein identical reference numerals denote the same elements throughout the various views, FIGS. 1-3 show a water manifold assembly 10 for use, for example, in an electric diesel locomotive engine. The exemplary water manifold assembly 10 includes a plurality of jumper lines 12 in flow communication with an interior of a manifold pipe 14. As shown in FIG. 3, the feed lines 12 communicate with an interior of the manifold pipe 14 through a plurality of water ports or orifices 18 (FIG. 3). A clamping assembly 20 attaches each jumper line 12 to the manifold pipe 14. A sealing gasket 22 is disposed about the orifice 18 in a manner well known in the art.

Figure 4:
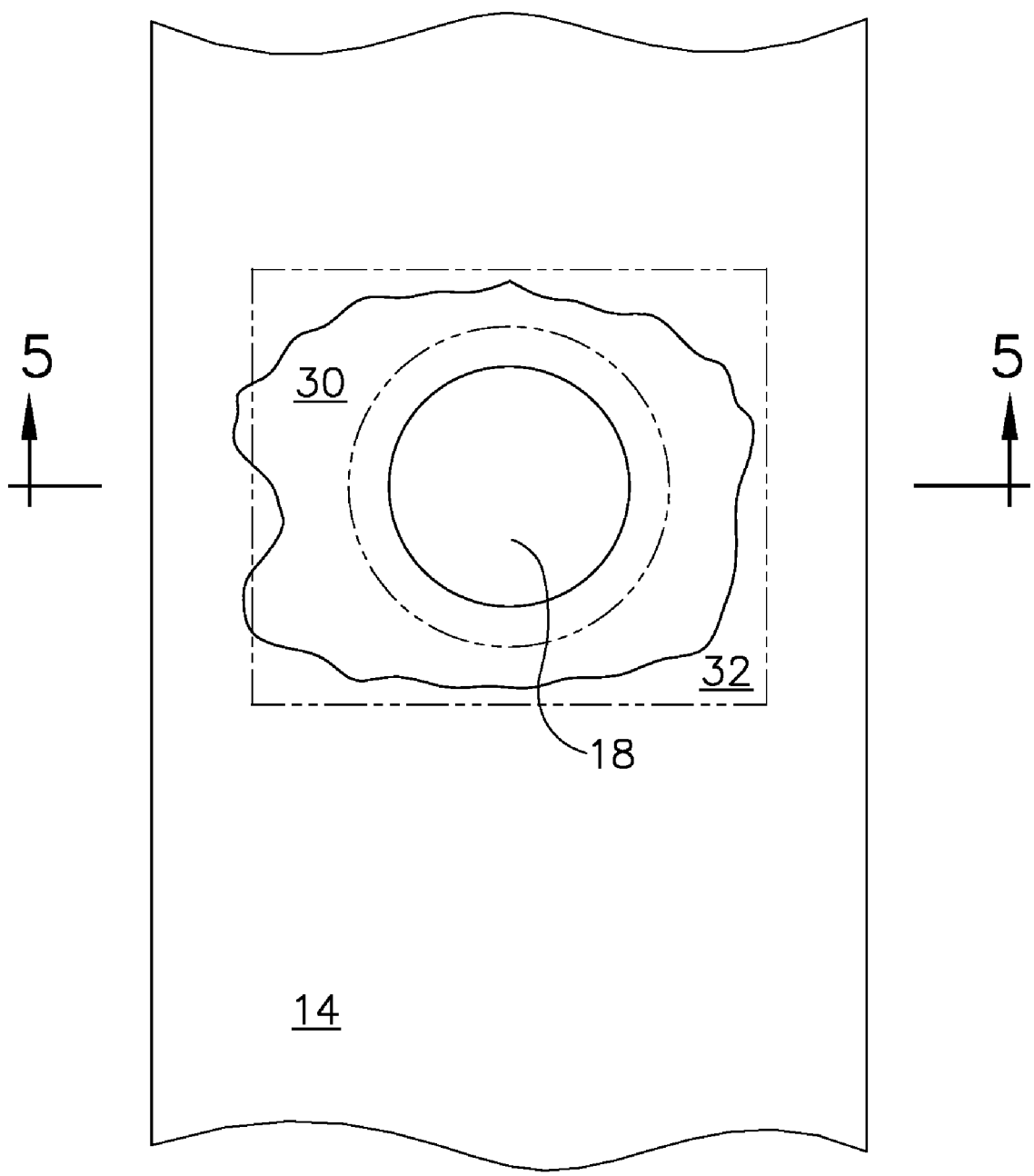
FIG. 4 is a plan view of a damage pipe orifice.
Figure 5:
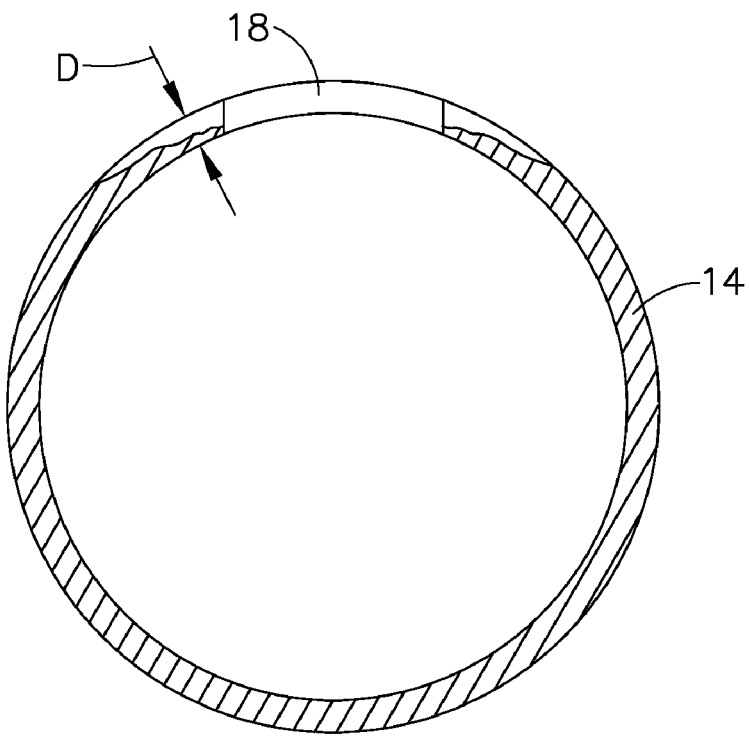
FIG. 5 is a sectional view taken along 5-5 of FIG. 4, illustrating a damaged region.

Over time, the iron-based manifold pipe 14 is subjected to water and foreign object exposure. When a locomotive engine is being overhauled, the water manifold is inspected for foreign object damage (FOD), corrosion at the water ports and attachment flanges, and geometric conformance. Excessive corrosion around the water ports may cause water leaks at the junction with the jumper lines. In an exemplary method, a repair method for an iron-based water manifold exhibiting an undesired extent of corrosion is provided. With reference to FIG. 4, the undesired corrosion may be manifested, for example, in at least a region 30 adjacent the water port or orifice 18. The corrosion deteriorates the dimension, D, of manifold pipe 14 as shown in FIG. 5. Further, the corrosion may extend past an area 32 (shown in phantom in FIG. 4) generally covered by the gasket 22 (see FIG. 3). Embodiments disclosed herein are directed at methods for repair and restoration of manifold pipes 14 exhibiting corrosion damage adjacent water ports.

Figure 6:
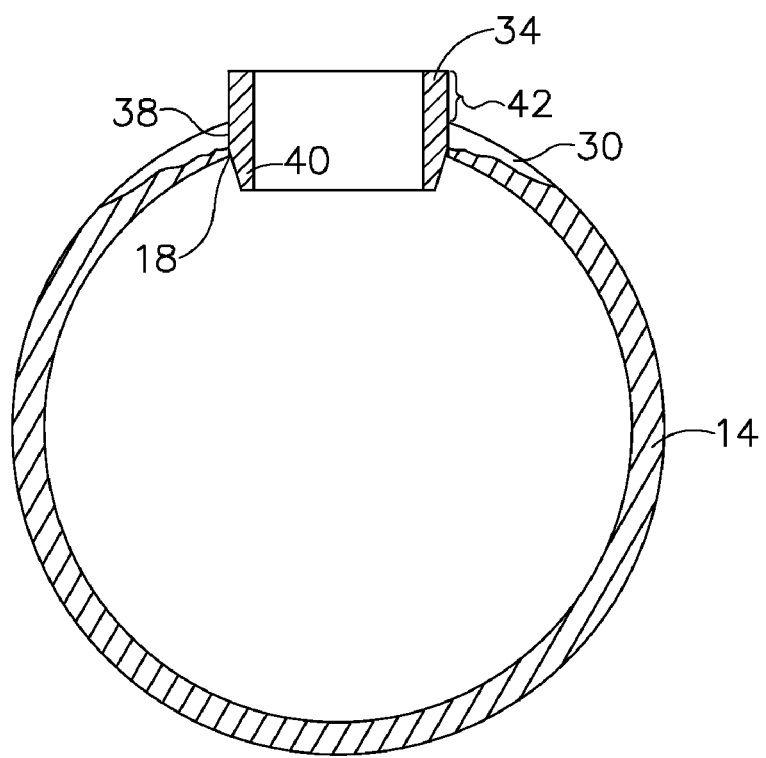
FIG. 6 is a sectional view illustrating insertion of a pipe segment into the manifold orifice.

In an exemplary method, at least the region 30 adjacent a selected water port or orifice 18 is cleaned to remove scale and to provide an adequate brazing surface. With reference to FIG. 6, in an exemplary embodiment, a pipe segment 34 is inserted into the orifice 18. Pipe segment 34 prevents braze material from flowing into the manifold pipe 14, as explained in greater detail below. An exemplary pipe segment 34 has an outer surface 38 dimensioned for close-fitting engagement within orifice 18. In an exemplary embodiment, the pipe segment 34 may include a tapered inner end 40. In an exemplary example, the pipe segment has a 1 ¼" outer diameter and comprises steel. The pipe segment 34 is inserted into the orifice 18 such that a portion 42 of the pipe segment 34 extends outwardly from the manifold pipe surface to provide a build-up or brazing form.

Figure 7:
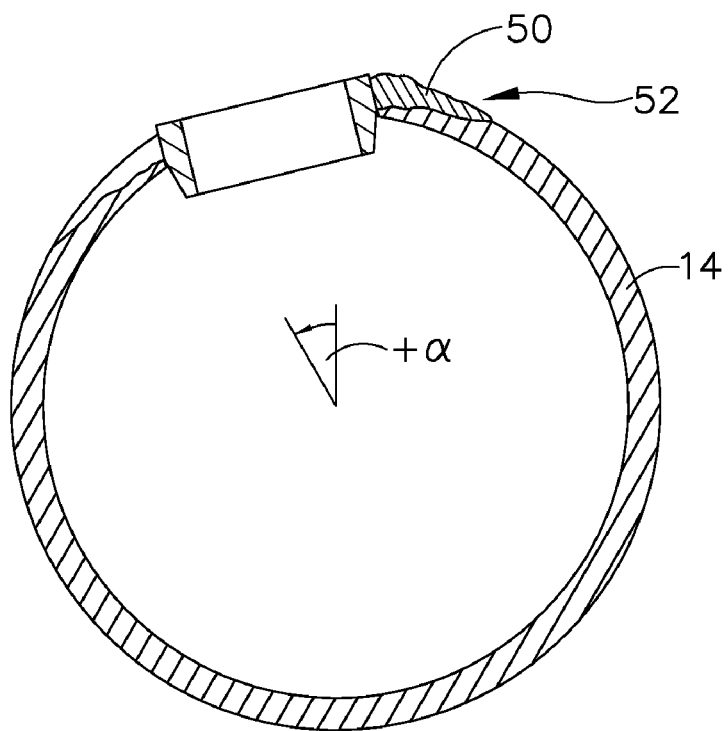
FIG. 7 is a sectional view, similar to FIG. 6, shown rotated in a first direction.

With reference to FIG. 7, in an exemplary method, the braze material 50 is applied to about a first half 52 of the region requiring build up. As illustrated, the manifold pipe 14 may be rotated a first angle, +α, (e.g. +10 to +15 degrees) for convenience in brazing the first half 52. The brazing material 50 is applied to the cleaned manifold pipe 14 and against the pipe segment 34 being used as a build-up or brazing form. In an exemplary embodiment, an oxy/acetylene torch is used to apply the braze material 50.

Figure 8:
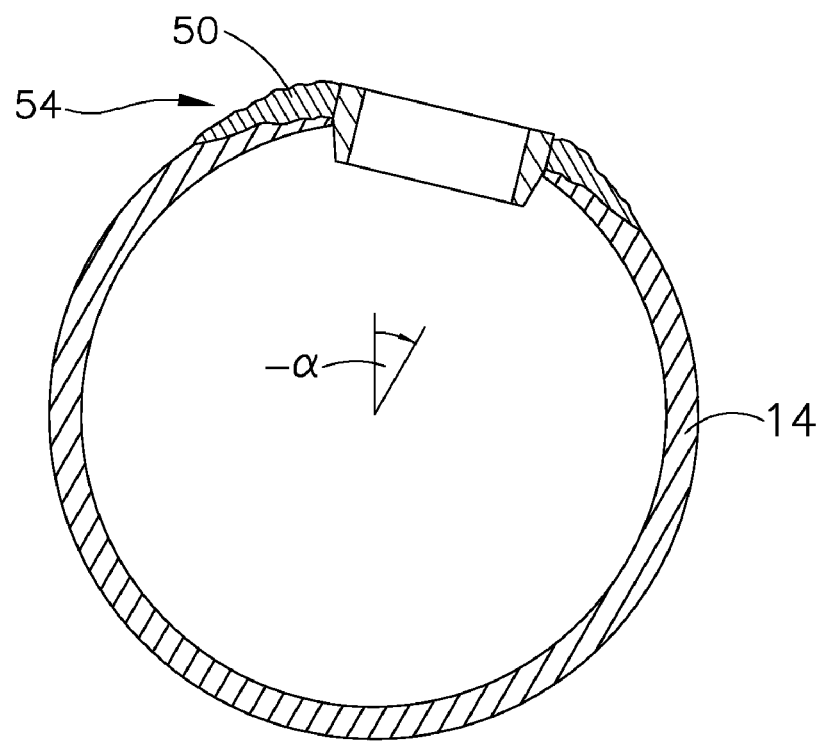
FIG. 8 is a sectional view, similar to FIG. 6, shown rotated in a second direction.

The manifold pipe 14, may be oppositely rotated a second angle, −α, (e.g., −10 to −15 degrees), as shown in FIG. 8 to conveniently present the second half 54 for brazing. Additional braze material 50 is applied to the second half 54 of the region requiring build up. In an exemplary embodiment, the buildup may be done in stages, i.e., in two or more layers.

Figure 9:
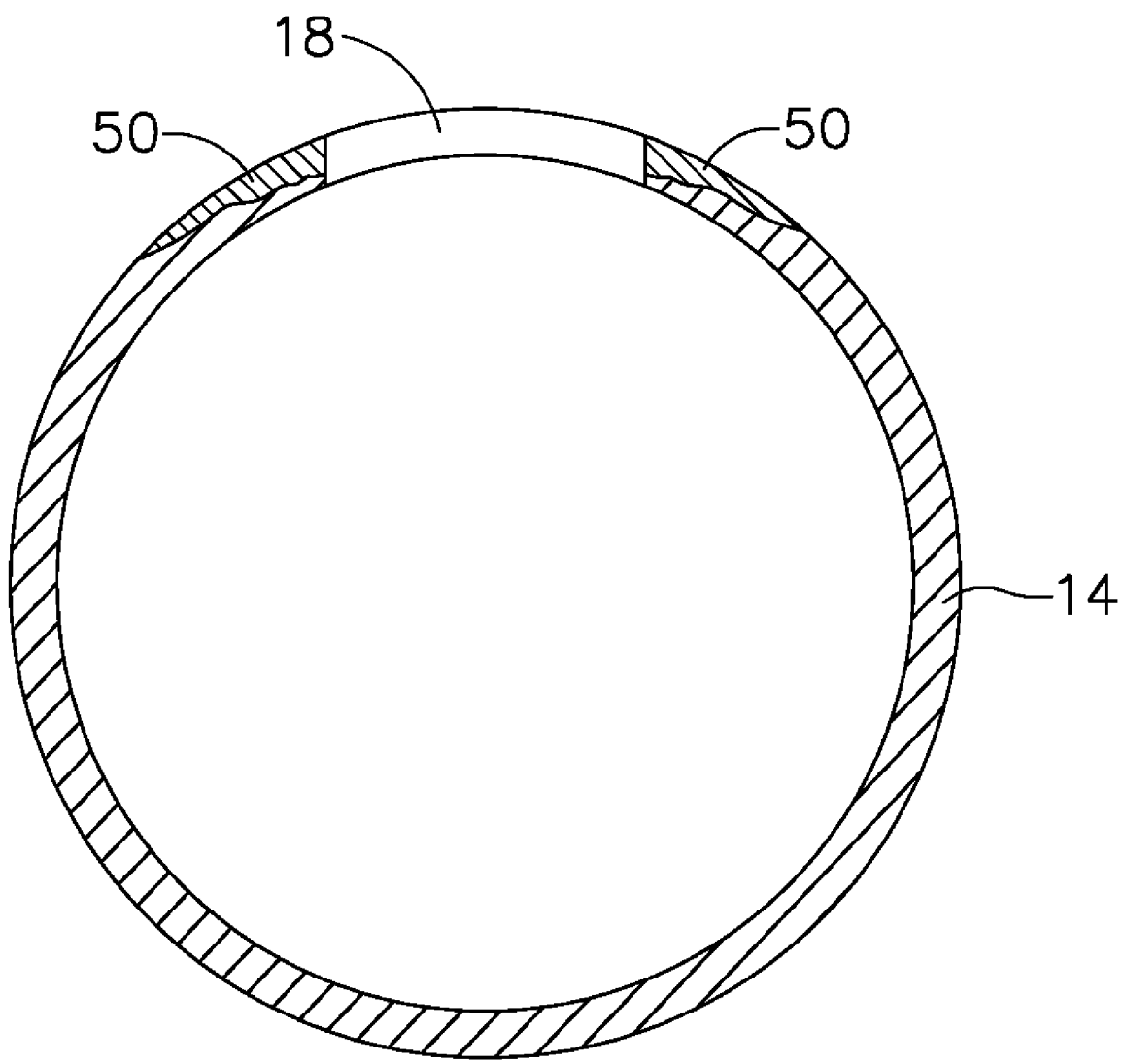
FIG. 9 is a sectional view similar to FIG. 5, showing the repair of the damaged region.

After cooling, the manifold pipe is processed to substantially restore the original geometry or dimension, as illustrated in FIG. 9. For example, the pipe segment 34 may be trimmed close to the braze build up to remove the extending portion 42, for example with a carbide burr, until it is level with the adjacent brazed surface. Excess braze material 50 may be removed in one or more steps so that the repaired region matches the manifold pipe 14. The portion of the pipe segment 34 inside the orifice 18 may be removed, for example, by using a carbide burr.

Finally, the water manifold pipe may be pressure tested to insure structural integrity of the repaired pipe. In an exemplary embodiment, a hydrostatic test rig is used for testing.

Figure 10:
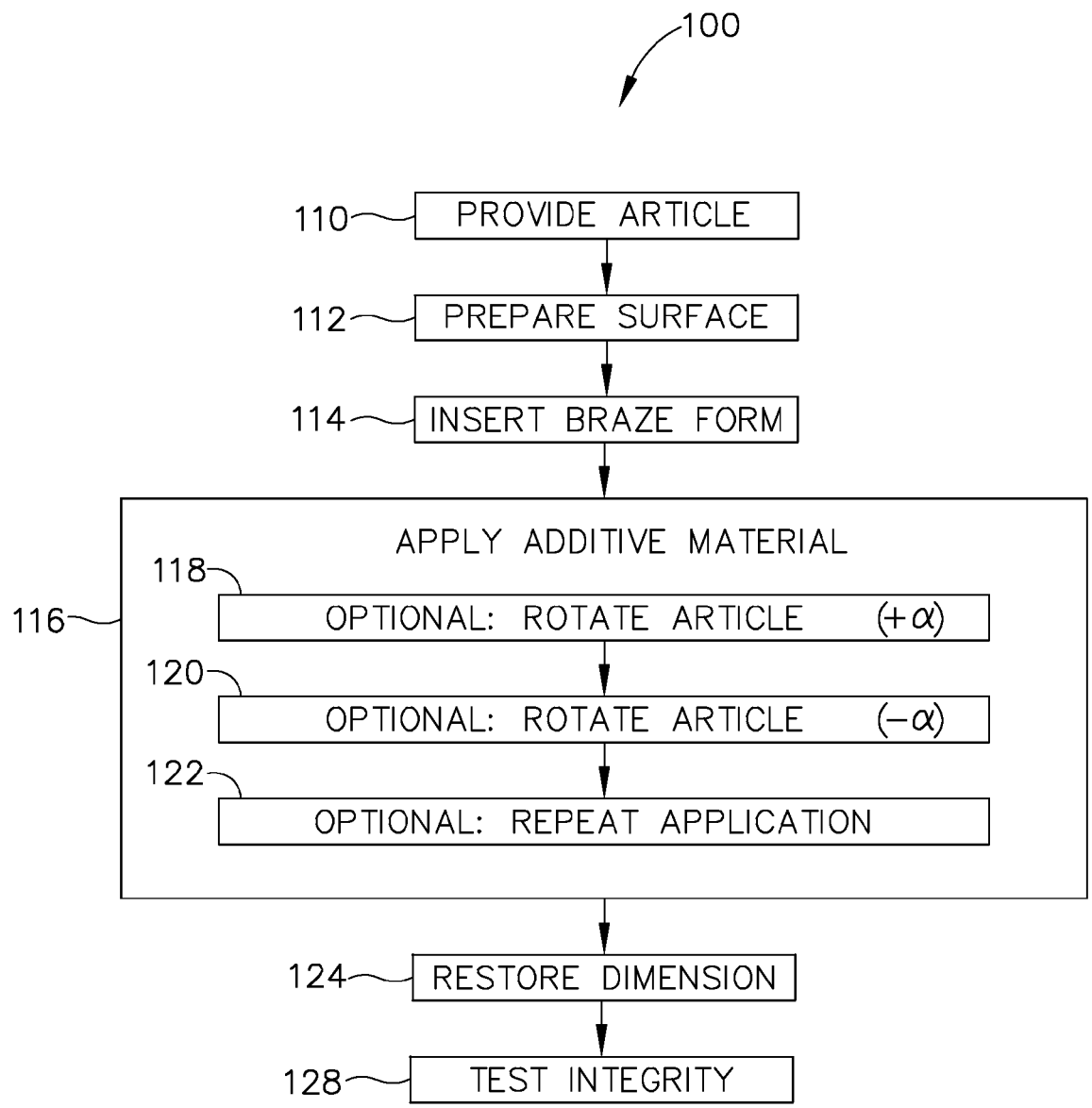
FIG. 10 is a flow chart of an exemplary method for repair of a water manifold.

An exemplary method may include the process steps provided in FIG. 10. In an exemplary method 100, an article, such as a water manifold pipe in need of repair, is provided (Step 110). The region requiring repair, such as the area adjacent a selected orifice, is cleaned (Step 112). A pipe segment is inserted into the selected orifice (Step 114). Thereafter, braze material is added to the article (Step 116). During repair of a water manifold pipe, prior to applying a first portion of the braze material, the pipe may be rotated in a first direction (Step 118). Thereafter, prior to applying a second portion of the braze material, the pipe may be rotated in a second direction (Step 120). Application of the braze material may be repeated (Step 122) so that the braze material is added in stages or layers to a sufficient thickness. Thereafter, the article, e.g., manifold pipe, may be restored to substantially an original dimension (Step 124) by removing excess braze material and the inserted pipe segment. The repaired article may be inspected or otherwise tested for structural integrity (Step 128).

Exemplary braze material includes fluxed 60/40 bronze. It is envisioned that those with skill in the art may utilize other effective means to accomplish the build up. Other suitable braze materials may be utilized by those with skill in the art to build up and seal the manifold pipe surface in order to diminish further corrosion of the manifold pipe during engine operation.

In other exemplary embodiments, a non-corrosive metal, such as a silver base braze material may be supplied around one or more orifices 18. In other exemplary embodiments, a high-temperature epoxy system may be supplied around one or more orifices 18. For purposes of this disclosure, the term "additive material" is intended to encompass material that may be applied by brazing (i.e., braze material) as well as material that can function in a similar manner (i.e., a high temperature epoxy system) to repair and restore deficient regions of the water manifold pipe.

EXAMPLE

The manifold assembly is examined for leaks at the gaskets due to corrosion producing void areas around the water ports or orifices. The region around an identified orifice is cleaned to remove scale and provide a clean brazing surface. A pipe segment (e.g., 1¼ inch diameter) is inserted into the orifice to prevent braze material from flowing into the manifold and to provide a braze form. Using an oxy/acetylene torch, the region around the orifice is preheated. Braze material such as fluxed 60/40 bronze material is applied to about a first half (180 degrees around the water port) of the surface that requires build up. The brazing position is changed to the opposite side to braze the second half (remaining 180 degrees around the water port). The manifold may be rotated in a first direction, then a second direction, to present convenient surfaces for brazing. The braze material may be applied in at least two layers to achieve an adequate build up. After cooling, the pipe segment is trimmed close to the braze build up. The remaining portion of the pipe segment may be benched, for example with a carbide burr, until it is level with the adjacent brazed surface. The braze build up may be benched in one or more steps to substantially match the profile of the adjacent manifold. The remaining portion of the pipe inside the orifice may be benched out, for example using a carbide burr.

Thus, the embodiments disclosed herein provide methods for repair and restoration of fluid-carrying articles, in particular water manifold pipes exhibiting excessive corrosion by inserting a pipe segment, used as a build-up or brazing form into a selected orifice of the manifold pipe, adding braze material around the inserted pipe segment, and thereafter restoring the manifold pipe to an original dimension.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of restoring a sidewall of a pipe comprising:
   providing a pipe capable of carrying fluid, the pipe defining at least one orifice through a sidewall thereof, a region of the outer surface of the sidewall adjacent the orifice being deteriorated so that a thickness of the sidewall at the deteriorated region is less than an original thickness of the sidewall;
   inserting a pipe segment into the orifice, a portion of the pipe segment extending outwardly from the outer surface of the sidewall for providing a form for supporting an additive material;
   applying an additive material to the sidewall at the deteriorated region and against the pipe segment to restore the thickness of the sidewall at the deteriorated region; and
   removing substantially all of the pipe segment.

2. The method according to claim 1 wherein applying an additive material includes brazing a material to the pipe.

3. The method according to claim 1 wherein in the pipe segment is dimensioned for close fitting engagement into the orifice.

4. The method according to claim 1 further comprising:
   removing excess of the additive material from the region adjacent the orifice to substantially restore an original dimension of the pipe.

5. The method according to claim 1 further comprising a step of:
   preparing the surface of the sidewall of the deteriorated region adjacent the orifice for receiving the additive material.

6. The method according to claim 1 further comprising a step of rotating the pipe prior to applying the additive material so that the deteriorated region is oriented for convenient application of the additive material.

7. The method according to claim 1 wherein the step of applying an additive material includes applying successive layers of the additive material.

8. The method according to claim 1 further comprising a step of
testing a structural integrity of the pipe.

9. The method according to claim 1 further comprising a step, following applying the additive material, of removing a portion of the pipe segment extending outwardly of the outer surface of the sidewall.

10. The method according to claim 1 further comprising a step, following applying the additive material, of removing a portion of the pipe segment extending into the pipe.

11. The method according to claim 1 wherein the pipe is a water manifold pipe.

12. The method according to claim 1 wherein the pipe comprises an iron-based material.

13. The method according to claim 1 wherein the additive material comprises an epoxy.

14. A method comprising:
a) providing a member capable of carrying fluid, wherein the member includes at least one orifice therein and at least one region of deficient dimension at an outer surface adjacent the orifice;
b) providing a build-up form extending into the orifice;
c) applying additive material to the at least one region around and against the build-up form to restore the at least one region to a sufficient dimension;
d) subsequent to (c), removing substantially all of the build-up form; and
e) wherein the member is a diesel locomotive water manifold pipe exhibiting corrosion in the at least one region adjacent the orifice.

15. A method comprising:
a) providing a water manifold pipe for a diesel locomotive, wherein the water manifold pipe includes at least one orifice therein and at least one region of deficient dimension at an outer surface adjacent the orifice;
b) inserting a pipe segment into the orifice, wherein when inserted, the pipe segment provides a build-up form adjacent the at least one region of deficient dimension;
c) applying additive material to the water manifold pipe around and against the build-up form to restore the at least one region to a sufficient dimension; and
d) subsequent to (c), removing substantially all of the pipe segment.

16. The method according to claim 15 further comprising:
e) prior to (c), preparing the outer surface adjacent the orifice for reception of the additive material.

17. The method according to claim 15 further comprising:
e) prior to applying at least a portion of the additive material in (c), rotating the manifold pipe a preselected angle, $+\alpha$; and
f) prior to applying at least an additional portion of the additive material in (c), rotating the manifold pipe in an opposite preselected angle, $-\alpha$.

18. The method according to claim 15 wherein in (c), applying additive material includes brazing a brazing material to the water manifold pipe at the at least one region of deficient dimension.

19. The method according to claim 18 wherein the brazing material is at least one member selected from fluxed 60/40 bronze and a silver base braze material.

20. The method according to claim 15 wherein in (c), apply additive material includes applying a high-temperature epoxy system to the water manifold pipe at the at least one region of deficient dimension.

* * * * *